US010284083B2

(12) United States Patent
Mueller (10) Patent No.: US 10,284,083 B2
(45) Date of Patent: May 7, 2019

(54) DC/DC CONVERTER WITH A FLYING CAPACITOR (71) Applicant: SMA SOLAR TECHNOLOGY AG, Niestetal (DE)

(72) Inventor: Burkard Mueller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/698,903

(22) Filed: Sep. 8, 2017

(65) Prior Publication Data
US 2017/0373593 A1    Dec. 28, 2017

Related U.S. Application Data (63) Continuation of application No. PCT/EP2016/053338, filed on Feb. 17, 2016.

(30) Foreign Application Priority Data

Mar. 10, 2015 (DE) .......................... 10 2015 103 490

(51) Int. Cl.
*H02M 3/156* (2006.01)
*H02M 1/10* (2006.01)
(Continued)

(52) U.S. Cl.
CPC ............. *H02M 3/156* (2013.01); *H02J 3/385* (2013.01); *H02J 7/35* (2013.01); *H02M 1/10* (2013.01);
(Continued)

(58) Field of Classification Search
CPC ........ H02M 3/156; H02M 3/155; H02M 7/42; H02M 1/10; H02J 7/35; H02J 7/345; H02J 3/385
See application file for complete search history.

(56) References Cited

U.S. PATENT DOCUMENTS 9,977,452 B2 * 5/2018 Abu Qahouq ............ G05F 1/67
2007/0029881 A1 * 2/2007 Lai .......................... H02J 9/062
307/82
(Continued)

FOREIGN PATENT DOCUMENTS

DE    102009052461 A1    5/2011
WO       2010047422 A2    4/2010
WO       2014056668 A2    4/2014

OTHER PUBLICATIONS

Veerachary, Mummadi, Two-Loop Controlled Buck—SEPIC Converter for Input Source Power Management, Article, Nov. 4, 2011, pp. 4075-4087. vol. 59, Issue: 11, Industrial Electronics, New Dehli, India.
(Continued)

*Primary Examiner* — Jue Zhang
(74) *Attorney, Agent, or Firm* — Eschweiler & Potashnik, LLC (57) ABSTRACT A DC/DC converter includes a first low-voltage terminal point, a second low-voltage terminal point and a third low-voltage terminal point, and a first high-voltage terminal point and a second high-voltage terminal point. The first low-voltage terminal point and the first high-voltage terminal point are directly connected to one another, and an actively drivable switching element, a capacitor and a further switching element are connected in series between the first high-voltage terminal point and the second high-voltage terminal point. The capacitor is connected between the second low-voltage terminal point and the third low-voltage terminal point, a further capacitance is directly connected between the second low-voltage terminal point and the third low-voltage terminal point, and the further capacitance is decoupled from the capacitor at two terminals by two inductors, respectively.

15 Claims, 3 Drawing Sheets

(51) Int. Cl.
   *H02M 3/155*   (2006.01)
   *H02J 3/38*    (2006.01)
   *H02J 7/35*    (2006.01)
   *H02M 7/42*    (2006.01)
   *H02J 7/34*    (2006.01)

(52) U.S. Cl.
   CPC ............ *H02M 3/155* (2013.01); *H02M 7/42* (2013.01); *H02J 7/345* (2013.01)

(56) References Cited

U.S. PATENT DOCUMENTS

| | | | |
|---|---|---|---|
| 2010/0148587 A1* | 6/2010 | Khaligh | H02M 1/10 307/72 |
| 2012/0112550 A1* | 5/2012 | Schill | H02M 3/155 307/77 |
| 2014/0246908 A1* | 9/2014 | Chew | H02M 3/156 307/24 |
| 2014/0339898 A1 | 11/2014 | Mueller | |
| 2015/0022179 A1 | 1/2015 | Krauter | |
| 2017/0179715 A1* | 6/2017 | Huang | H02M 3/07 |

OTHER PUBLICATIONS

Gules, R. A Modified SEPIC Converter with High Static Gain for Renewable Applications, Article, Sep. 11-15, 2011, Power Electronics Conference, Curitiba, Brazil.

International Search Report dated May 19, 2016 for International Application PCT/EPT2016/053338.

* cited by examiner

DC/DC CONVERTER WITH A FLYING CAPACITOR

CROSS-REFERENCE TO RELATED APPLICATIONS

This application is a continuation of PCT Patent Application Number PCT/EP2016/053338, filed on Feb. 17, 2016, entitled "DC/DC Converter with a Flying Capacitor", which claims priority to German Patent Application Number DE 102015103490.5, filed on Mar. 10, 2015, and is hereby incorporated by reference in its entirety.

FIELD

The disclosure relates to a DC/DC converter. Furthermore, the disclosure relates to inverters and other electrical circuits comprising such a DC/DC converter.

BACKGROUND

DC/DC converters comprising a so-called flying capacitor are known. In such DC/DC converters, such as are disclosed by US 2013/0119961 A1 for example, an actively drivable switching element, a capacitor and a further switching element are connected in series between two output terminal points forming an output for a DC output voltage. In this case, a half-bridge comprising an actively drivable half-bridge switching element and a further half-bridge switching element is connected in parallel with the capacitor. The center point of the half-bridge is connected to an input for a DC input voltage via an input inductor. The actively drivable switching element and the actively drivable bridge switching element are driven successively such that firstly the capacitor is charged to the DC input voltage via the input inductor and then the charged capacitor is connected in series with the input inductor. In this case, the electrical potential of the capacitor, i.e. of its electrodes, jumps, from which the designation as a flying capacitor originates. In the described known DC/DC converters comprising a flying capacitor, moreover, the input inductor may be used as a boost converter inductor for boosting the DC input voltage by virtue of the actively drivable switching element and the actively drivable bridge switching element being driven synchronously.

The jumping electrical potential of the capacitor results in limitations for the possible uses of a DC/DC converter comprising a flying capacitor.

DE 10 2011 085 559 A1 discloses a DC/DC converter comprising a parallel circuit formed by a capacitor with at least one chopper. Each chopper comprises a half-bridge comprising two actively drivable bridge switching elements, said half-bridge being connected in parallel with the capacitor. An input inductor is connected to the center point of the half-bridge. Furthermore, an additional half-bridge comprising two actively drivable bridge switching elements is connected in parallel with the capacitor, an output inductor being connected to the center point of said additional half-bridge. Moreover, the capacitor is connected in series with a stabilizing capacitor. A DC voltage source may be connected to each input inductor of the known DC/DC converter, wherein the DC input voltages present at different input inductors may differ from one another. A DC output voltage is output at the output inductor. In this case, the DC input voltages and the DC output voltage are present relative to a connecting line to which the stabilizing capacitor is connected. A further DC voltage source may be connected by supplementation of a further half-bridge with a further input inductor. As a result of the capacitor being connected in series with the further capacitor, it is necessary to convert in each case only the portions of the DC input voltages which are different, and the actively drivable bridge switching elements need only be designed for the portion of the DC input voltages which is converted. In order to keep the voltage at the stabilizing capacitor constant, however, the DC output voltage of the known DC/DC converter must always be a weighted average of the DC input voltages. In order to connect the known DC/DC converter to a link circuit having a relatively high link circuit voltage, it is therefore necessary to provide an additional boost converter, the components of which have to be designed for the full link circuit voltage and the entire power flowing via the DC/DC converter.

"Veerachary, M.: Two-Loop Controlled Buck-SEPIC Converter for Input Source Power Management. In: Industrial Electronics, IEEE Transactions on (Volume: 59, Issue: 11), 4 Nov. 2011, 4075-4087" discloses a converter topology which combines a buck converter for a voltage source having a relatively high voltage with a SEPIC converter for a voltage source having a relatively low voltage that is separated therefrom. The outputs of the buck converter and of the SEPIC converter are connected to one another, wherein the chopper inductor of the buck converter is connected to the input side of the output-side diode of the SEPIC converter.

"Gules, R. et al.: A modified SEPIC converter with high static gain for renewable applications. In: Power Electronics Conference (COBEP), 2011 Brazil, 11-15 Sep. 2011, 162-167" disclose a modified SEPIC converter comprising an additional diode and an additional capacitor in comparison with a traditional SEPIC converter. In this case, the capacitor is connected in series with the second inductor of the SEPIC converter, and the diode connects a node between the first inductor and the switch to a node between the second inductor and the additional capacitor of the SEPIC converter.

DE 10 2009 052 461 A1 discloses a buck converter for charging a divided DC voltage link from a photovoltaic generator. In this case, the buck converter comprises one buck converter switch, two buck converter diodes and two coupled buck converter inductors. One of the buck converter diodes and one of the buck converter inductors are respectively connected in parallel with one of two series-connected capacitors of the divided DC voltage link.

SUMMARY

The disclosure addresses the problem of presenting a DC/DC converter which is suitable for a plurality of DC input voltages from a plurality of DC voltage sources and the switching elements of which are nevertheless not loaded with its full DC output voltage.

In one embodiment, a DC/DC converter according to the disclosure comprises a first, a second and a third low-voltage terminal point, and a first and a second high-voltage terminal point, wherein the first and second low-voltage terminal points form a first low-voltage terminal for a first low DC voltage and the first and third low-voltage terminal points form a second low-voltage terminal for a second low DC voltage, wherein the first and second high-voltage terminal points form a high-voltage terminal for a high DC voltage, and wherein the first low-voltage terminal point and the first high-voltage terminal point are directly connected to one another. The DC/DC inverter further comprises an actively drivable switching element, a capacitor and a further switching element connected in series between the first and second high-voltage terminal points, wherein the capacitor is connected between the second and third low-voltage terminal points. A further capacitance, for example, a further capacitor, is directly connected between the second low-voltage terminal point and the third low-voltage terminal point, and the further capacitance is decoupled from the capacitor at both poles by two inductors. That is to say that the inductors lie respectively between the second and the third low-voltage terminal point, on the one hand, and one of the two electrodes of the capacitor, on the other hand. Upon the active driving of the actively drivable switching element, jumps in the potential of the capacitor are thus not transmitted directly to the further capacitance and the second and third low-voltage terminal points, and accordingly are also not transmitted to the first and second low-voltage terminals. In this regard, the jumps in potential also do not affect DC voltage sources connected to these inputs. This simplifies, in particular, the parallel connection of a larger number of DC voltage sources to the low-voltage terminals, as will be set out in even greater detail. By driving the actively drivable switching element connected in series with the capacitor, in the novel DC/DC converter the high DC voltage is set relative to the low DC voltages, wherein the high DC voltage may also be set higher than the average low DC voltage.

Insofar as mention is made here of the fact that the first low-voltage terminal point and the first high-voltage terminal point are directly connected to one another, and of the fact that the further capacitance is directly connected between the second low-voltage terminal point and the third low-voltage terminal point, and also in corresponding contexts, "directly" means one or more electrically conducting galvanic connections in which no electrical or electronic components which significantly influence the current flow via the connections are arranged. However, this does not exclude the presence of small resistances, inductances or capacitances in or at the connections.

In one embodiment, the two inductors that decouple the further capacitance from the capacitor may be magnetically coupled in the manner of a current-compensated inductor, which is also referred to as common mode inductor or common mode choke. The coupled inductor of the DC/DC converter according to the disclosure then has a high inductance for common mode currents and a low inductance for differential mode currents. With their high inductance for common mode signals, the magnetically coupled inductors decouple the further capacitor and thus also the second and third low-voltage terminal points in particular from jumps in the potential of the capacitor connected in series with the switching elements. By contrast, their low inductance for differential mode signals ensures fast recharging of the capacitor from the further capacitance. The energy storage capability of the two magnetically coupled inductors is, in one embodiment, significantly greater compared with a customary current-compensated inductor. In terms of construction they thus correspond to coupled sinusoidal filter inductors between the further capacitance and the capacitor, although one of the two inductors is connected "with polarity reversal".

When mention is made of low-voltage terminal points or high-voltage terminal points in the description of the DC/DC converter according to the disclosure, this does not necessarily mean that the DC/DC converter ends at said low-voltage or high-voltage terminal points and that, for example, DC voltage sources would have to be directly connected to these terminal points. Rather, the DC/DC converter may also have constituent parts lying upstream of the low-voltage terminal points and downstream of the high-voltage terminal points. Between the low-voltage terminal points and the high-voltage terminal points, however, low DC voltages and respectively a high DC voltage are present during the operation of the DC/DC converter. In this case, the low DC voltages may be provided directly or indirectly, i.e. with the interposition of controllers, by one or more DC voltage sources. Likewise, the high DC voltage may be used directly or indirectly, i.e. with the interposition of further controllers.

In the DC/DC converter according to the disclosure, a stabilizing capacitor may be connected between the first low-voltage terminal point and the second and/or the third low-voltage terminal point, which stabilizing capacitor is thus directly connected in series with the further capacitance between the first low-voltage terminal point and the third low-voltage terminal point. The series connection of the stabilizing capacitor and the further capacitance forms, together with the inductors, an LC filter which filters out the jumps in the potential of the capacitor, such that the low DC voltages at the low-voltage terminal points remain stable. Alternatively or additionally, a stabilizing capacitor may be connected between the first low-voltage terminal point and the third low-voltage terminal point.

In one embodiment of the DC/DC converter according to the disclosure, in parallel with the series connection of the actively drivable switching element, the capacitor and the further switching element, a link circuit capacitor may be connected between the first high-voltage terminal point and the second high-voltage terminal point. The high DC voltage is then dropped across said link capacitor, and the link capacitor stabilizes the voltage over the pulses with which the actively drivable switching element connected in series with the capacitor is driven for controlling the high DC voltage.

In an electrical circuit comprising the DC/DC converter according to one embodiment of the disclosure, in each case a DC voltage source may be directly connected to the first low-voltage terminal and/or the second low-voltage terminal, said DC voltage source providing the first and/or the second low DC voltage. Said DC voltage sources may be e.g. PV generators or stores for electrical energy such as batteries or capacitors. The difference between the two low DC voltages, which is used for charging the further capacitor and the capacitor, is then predefined directly by the two DC voltage sources.

A greater flexibility is achieved if in one embodiment at least one half-bridge comprising an actively drivable bridge switching element and a further bridge switching element is connected between the second low-voltage terminal point and the third low-voltage terminal point, wherein a center point of the half-bridge is connected to a further low-voltage terminal point via an input inductor, which further low-voltage terminal point together with the first low-voltage terminal point forms a further low-voltage terminal for connecting a further DC voltage source. In this case, however, the designation of the DC voltage source as "further" DC voltage source means only that it is connected via the half-bridge described. Besides the further DC voltage source or else a plurality of such further DC voltage sources, it is not necessary to provide DC voltage sources directly connected to the first low-voltage terminal or the second low-voltage terminal. Conversely, besides one or more further DC voltage sources which are connected to the second and third low-voltage terminal points in each case via a half-bridge and which may be used in this respect for providing both the first low DC voltage and the second low DC voltage, a DC voltage source directly connected to one or the other low-voltage terminal may be provided.

In the embodiment comprising a half-bridge, the DC/DC converter according to the disclosure corresponds to a DC/DC converter comprising a flying capacitor, wherein the flying capacitor is divided into the output-side capacitor and the input-side further capacitance, which are decoupled from one another by the inductors.

If in one embodiment the further DC voltage source is a photovoltaic generator or some other pure generator, the further bridge switching element of the respective half-bridge may be a diode. However, if the further DC voltage source is a battery or some other store for electrical energy that is intended both to be discharged and to be charged, the respective half-bridge should be embodied in a bidirectional fashion. To that end, the further bridge switching element must be actively drivable, with the result that with the half-bridge it is possible to bring about a voltage difference between the further low-voltage terminal point and the first low-voltage terminal point which is such that it leads to the desired current in the charging and/or discharging direction of the store for electrical energy.

In one embodiment, if the further switching element connected in series with the capacitor is actively drivable, the DC/DC converter according to the disclosure may be operated bidirectionally between its first, second and third low-voltage terminal points, on the one hand, and its first and second high-voltage terminal points, on the other hand. A store for electrical energy that is connected as a DC voltage source or further DC voltage source may then be charged via the capacitor from a link at the high-voltage terminal of the DC/DC converter. In general terms, too, the energy need not flow from the low-voltage terminal points to the high-voltage terminal points, rather the DC/DC converter according to the disclosure may be enhanced by the choice of suitable switching elements for an opposite or even alternating (bidirectional) energy flow.

In one embodiment, in the DC/DC converter according to the disclosure, at least two half-bridges comprising in each case an actively drivable bridge switching element and a further bridge switching element may be connected in parallel between the second low-voltage terminal point and the third low-voltage terminal point, wherein the center point of the respective half-bridge is connected respectively to a further low-voltage terminal point via an input inductor, which further low-voltage terminal point together with the first low-voltage terminal point forms a respective further low-voltage terminal for connecting a respective further DC voltage source. If the two further DC voltage sources are different photovoltaic generators, wherein different here also covers a different alignment of the respective photovoltaic modules or else only small variations between the photovoltaic generators, separate MPP tracking for each of the photovoltaic generators may be carried out by corresponding driving of the actively drivable bridge switching elements. That is to say that different boosting of the voltage of the photovoltaic generators sets different operating points of the photovoltaic generators, at which the respective photovoltaic generator produces its maximum power.

In one embodiment the further DC voltage sources may also comprise a battery besides one or more photovoltaic generators. Said battery may then be charged directly from the photovoltaic generator(s). This charging of the battery, by means of the driving of the actively drivable switching elements of the half-bridge thereof, may be carried out independently of MPP tracking of the individual photovoltaic generators because the voltage that drives the charging of the battery is adjustable.

It goes without saying that the capacitor, the further capacitance, each stabilizing capacitor and each link circuit capacitor of the DC/DC converter according to the disclosure independently of one another may comprise a series and/or parallel connection of a plurality of individual capacitors, in one embodiment.

It is furthermore possible to use a battery or some other store for electrical energy for forming the further capacitance, specifically in parallel with or instead of a further capacitor.

An additional low-voltage terminal point of the DC/DC converter according to the disclosure may be directly connected to the second high-voltage terminal point. Said additional low-voltage terminal point together with the second, the third or a further low-voltage terminal point forms a third, a fourth or else a further low-voltage terminal, to which a DC voltage source may likewise be connected. Said DC voltage source then has a different reference potential than each DC voltage source that is connected to the first low-voltage terminal point.

Advantageous developments of the disclosure are evident from the patent claims, the description and the drawings. The advantages of features and of combinations of a plurality of features as mentioned in the description are merely by way of example and may come into effect alternatively or cumulatively, without the advantages necessarily having to be achieved by embodiments according to the disclosure. Without the subject matter of the accompanying patent claims being altered thereby, the following applies to the disclosure content of the original application documents and of the patent: further features can be gathered from the drawings—in particular from the illustrated geometries and the relative dimensions of a plurality of components with respect to one another and also from their relative arrangement and operative connection. The combination of features of different embodiments of the disclosure or of features of different patent claims is likewise possible departing from the chosen dependency references of the patent claims and is suggested hereby. This also concerns such features that are illustrated in separate drawings or are mentioned in the description thereof. These features may also be combined with features of different patent claims. It is likewise possible to omit features present in the patent claims for further embodiments of the disclosure.

The features mentioned in the patent claims and the description should be understood, with regard to their number, such that exactly this number or a greater number than the number mentioned is present, without the need for explicit use of the adverb "at least". Therefore if a capacitor is mentioned, for example, this should be understood to mean that exactly one capacitor, two capacitors or more capacitors are present. These features may be supplemented by other features or be the sole features that the respective product consists of.

The reference signs contained in the patent claims do not restrict the scope of the subjects protected by the patent claims. They merely serve the purpose of making the patent claims more easily comprehensible.

BRIEF DESCRIPTION OF THE DRAWINGS

The disclosure is explained and described further below on the basis of exemplary embodiments illustrated in the figures.

DESCRIPTION

The disclosure relates to a DC/DC converter comprising a high-voltage terminal for a high DC voltage, said high-voltage terminal being formed by a first and a second high-voltage terminal point, wherein an actively drivable switching element, a capacitor and a further switching element are connected in series between the first and second high-voltage terminal points, and wherein the capacitor is connected between two low-voltage terminal points, at which two different DC input voltages are present. Furthermore, the disclosure relates to inverters and other electrical circuits comprising such a DC/DC converter.

Figure 1:
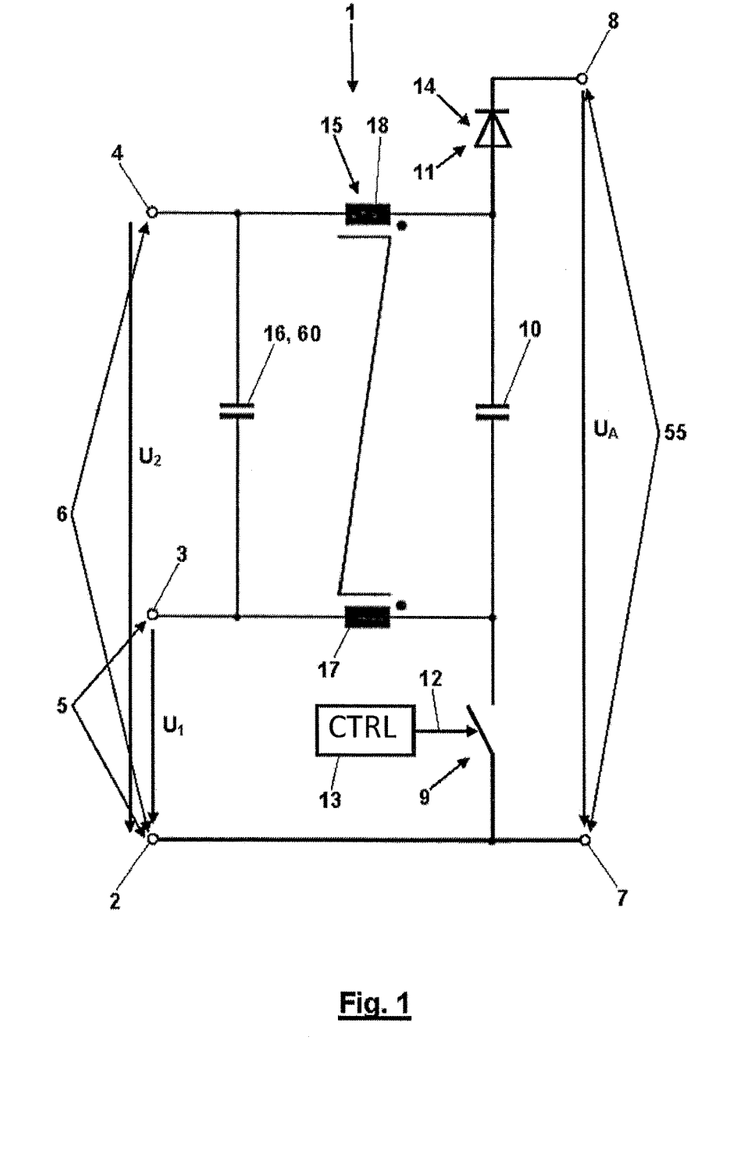
FIG. 1 shows a first embodiment of the DC/DC converter according to the disclosure.

The DC/DC converter 1 shown in FIG. 1 comprises a first low-voltage terminal point 2, a second low-voltage terminal point 3 and a third low-voltage terminal point 4. The second low-voltage terminal point 3 and the first low-voltage terminal point 2 form a first low-voltage terminal 5 for a first low DC voltage $U_1$. The first low-voltage terminal point 2 and the third low-voltage terminal point 4 form a second low-voltage terminal 6 for a second low DC voltage $U_2$. A first high-voltage terminal point 7 and a second high-voltage terminal point 8 of the DC/DC converter 1 form a high-voltage terminal 55 for a high DC voltage $U_A$. The first low-voltage terminal point 2 is directly connected to the first high-voltage terminal point 7. An actively drivable switching element 9, a capacitor 10 and a further switching element 11 are connected in series between the high-voltage terminal point 7 and the second high-voltage terminal point 8. The actively drivable switching element 9 is drivable with a drive signal 12 by a controller 13 in order to connect the capacitor 10 to the first high-voltage terminal point 7 temporarily on one side. The further switching element 11 here is a diode 14 that is blocking whenever the actively drivable switching element 9 is closed. The capacitor 10 is furthermore connected between the second low-voltage terminal point 3 and the third low-voltage terminal point 4, but not directly, but rather with the interposition of inductors 17, 18 with a magnetic coupling 15. By contrast, a further capacitance 16, here in the form of a further capacitor 60, is directly connected between the second low-voltage terminal point 3 and the third low-voltage terminal point 4. Although the two capacitors 10 and 60 are thus connected in parallel with one another, in principle, in this case they are decoupled by the inductors 17, 18. The type of magnetic coupling 15 of the inductors 17, 18 corresponds to that of a current-compensated inductor. That is to say that the coupled inductors 17, 18 have a low inductance for differential mode currents and a high inductance for common mode currents between the capacitors 10 and 60. In this way, jumps in potential that occur at the capacitor 10 upon the driving of the switching element 9 are kept away from the further capacitor 60, but at the same time voltage differences between the two capacitors 10 and 60 are immediately compensated for since the compensation current is a differential mode current which the coupled inductors 17, 18 oppose with practically no impedance. It goes without saying that in this case the actually implemented voltage coupling and also the potential decoupling of the capacitors 10 and 60 are dependent on the design of the inductors 17, 18 and the magnetic coupling 15 thereof, in particular the leakage inductance. Moreover, they are dependent on the properties of a DC voltage source that provides the low DC voltage $U_1$.

Figure 2:
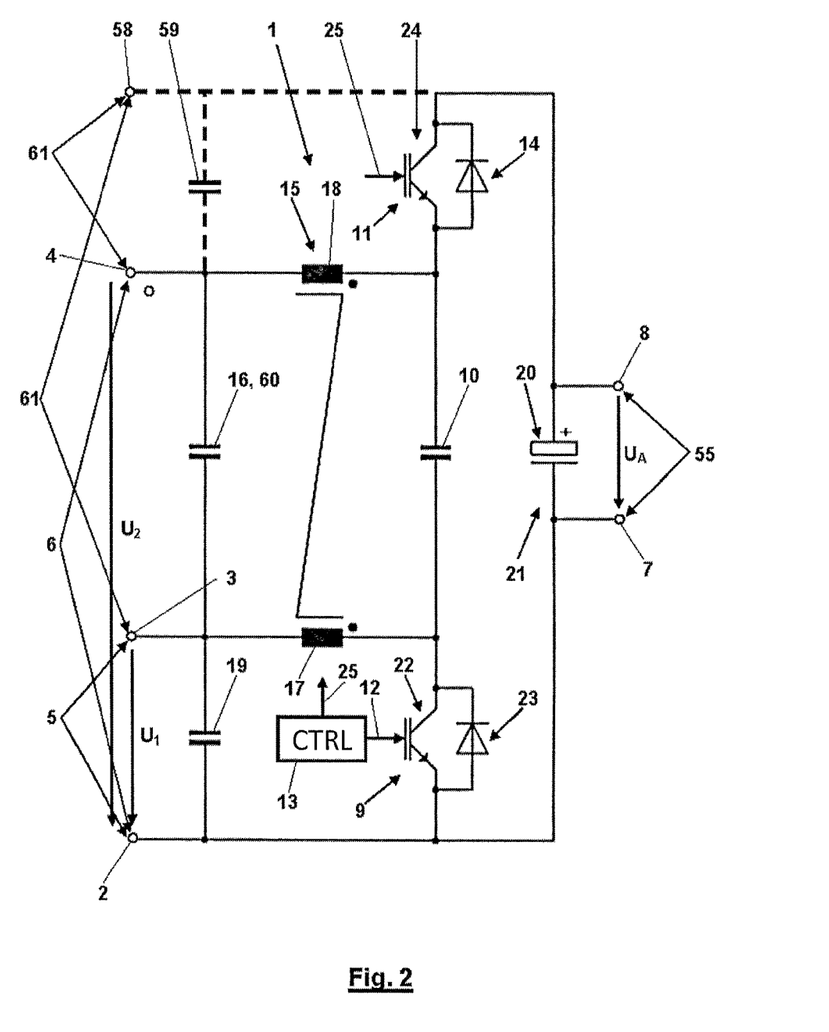
FIG. 2 shows a second embodiment of the DC/DC converter according to the disclosure.

The embodiment of the DC/DC converter 1 according to the disclosure in accordance with FIG. 2 is supplemented by further components relative to the embodiment in accordance with FIG. 1 and specified in the following details. A stabilizing capacitor 19 is connected between the first low-voltage terminal point 2 and the second low-voltage terminal point 3, which stabilizing capacitor is charged by the first low DC voltage $U_1$ and stabilizes said low DC voltage $U_1$ such that the further capacitance 16 may be supported at said stabilizing capacitor with regard to the electrical potential at the input terminal point 3. The decoupling of the further capacitance 16 from the capacitor 10 by the magnetically coupled inductors 17, 18 is supported in this way. A link capacitor 20 is connected between the high-voltage terminal points 7 and 8, which link capacitor stabilizes the high DC voltage $U_A$ and forms a voltage link circuit 21. The actively drivable switching element 9 is embodied here as a semiconductor switch, specifically as a transistor 22 with an inverse diode 23. The further switching element 11, too, here is an actively drivable switching element 24 in the form of a transistor 24, the inverse diode of which forms the diode 14. The actively drivable switching element 24 is drivable by the controller 13 by means of a further drive signal 25. In this way, the DC/DC converter 1 is bidirectionally operable, and the further capacitance 16 may be charged via the capacitor 10 from the voltage link 21.

In the DC/DC converter 1 according to the disclosure, the actively drivable switching element 9 and the further switching element 11 need not be designed for the full high DC voltage $U_A$, but rather only for the difference between the high DC voltage $U_A$ and the voltage dropped across the capacitor 10. The low DC voltages $U_1$ and $U_2$ may be provided for example by two different photovoltaic generators. Expediently, the low DC voltage $U_2$ is always greater than the low DC voltage $U_1$.

FIG. 2 shows with dashed lines an optional additional low-voltage terminal point 58, which is connected directly to the second high-voltage terminal point 8 and, via an additional stabilizing capacitor 59, to the third low-voltage terminal point 4. In this way, a third and a fourth low-voltage terminal 61 and 62, respectively, having a different reference potential are provided, to which alternative or additional DC voltage sources may be connected.

Figure 3:
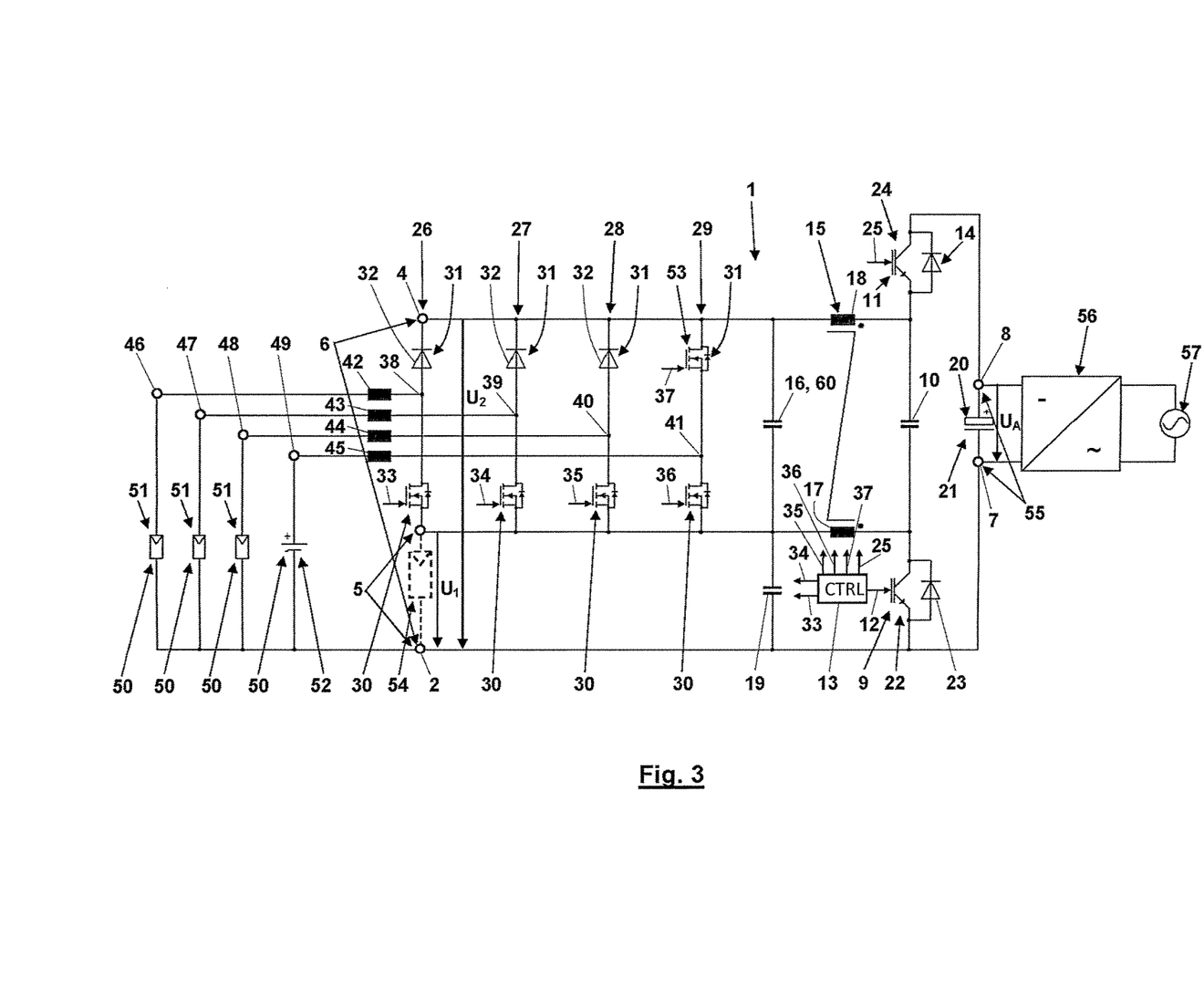
FIG. 3 shows an extended embodiment of the DC/DC converter according to the disclosure by comparison with the embodiment in accordance with FIG. 2, wherein here a plurality of photovoltaic generators and a battery are connected on the input side and an inverter that feeds into an AC voltage grid is connected on the output side.

The embodiment of the DC/DC converter 1 in accordance with FIG. 3 differs from that in accordance with FIG. 2 in that a plurality of half-bridges 26 to 29 are connected in parallel with the further capacitance 16 between the low-voltage terminal points 3 and 4, which half-bridges each consist of an actively drivable bridge switching element 30 and a further bridge switching element 31. In the case of the half-bridges 26 to 28, the further bridge switching element 31 is a diode 32. In the case of the half-bridge 29, the further bridge switching element 31 is a further actively drivable bridge switching element 53. The actively drivable bridge switching elements 30 and 53 are driven by the controller 13 with control signals 33 to 37. Input inductors 42 to 45 are connected to center points 38 to 41 of the half-bridges 26 to 29, and lead to further low-voltage terminal points 46 to 49. A DC voltage source 50 is connected between the first low-voltage terminal point 2 and each of the further low-voltage terminal points 46 to 49. This involves a respective photovoltaic generator 51 in the case of the further low-voltage terminal points 46 to 48 and a battery 52 in the case of the further low-voltage terminal point 49. This means that the battery 52 is connected to the second low-voltage terminal point 3 and the third low-voltage terminal point 4 via the half-bridge 29 comprising the two actively drivable bridge switching elements 30 and 53, while the photovoltaic generators 51 are connected to said low-voltage terminal points 3 and 4 in each case via one of the half-bridges 26 to 28 comprising the actively drivable bridge switching element 30 and the diode 32. By driving the bridge switching elements 30 of the half-bridges 26 to 28 it is possible, with appropriate low DC voltages $U_1$ and $U_2$, to set the operating voltages of the individual photovoltaic generators 51 for example with the aim of MPP tracking. In this case, the respective half-bridge 26 to 28 in conjunction with the associated input inductor 42 to 44 is operated as a boost converter. The driving of the bridge switching elements 30 and 53 of the half-bridge 29 determines whether the battery 52 is charged or discharged, which is dependent on whether the voltage set at the further low-voltage terminal point 49 constitutes a charging voltage or a discharging voltage for the battery 52. With the aid of the actively drivable switching element 24 connected in series with the capacitor 10, the battery 52 may also be charged from the high DC voltage link circuit 21. An additional photovoltaic generator 54, illustrated by dashed lines, may be directly connected between the low-voltage terminal points 2 and 3. Likewise, an additional photovoltaic generator (not illustrated here) may be directly connected between the low-voltage terminal points 2 and 4. The input inductors 42 to 45 may have very small inductances, such that they are printed circuit board-mountable because as boost converter inductors in conjunction with the half-bridges 26 to 29 they are loaded only with portions of the low DC voltages. Said portions remain small if there are only small voltage differences between the DC voltage sources 50. Here a DC/AC converter 56 is connected to the high-voltage terminal 55 of the DC/DC converter 1, and inverts the high DC voltage $U_A$ in order to feed electrical energy from the voltage link 21 into an AC voltage grid 57. The electrical circuit illustrated overall in FIG. 3 is that of an inverter comprising the DC/AC converter 56, upstream of which the DC/DC converter according to the disclosure is connected.

Without this being encompassed by the patent claims, a modification of the DC/DC converter 1 which is illustrated in FIG. 3 is also disclosed as an independent disclosure here, in which the inductors 17 and 18 are not present between the capacitor 10 and the further capacitance 16 and in which the capacitor 10 and the further capacitance 16 may be combined to form a single capacitor. The DC/DC converter 1 then corresponds to a DC/DC converter comprising a flying capacitor in which a plurality of half-bridges are connected in parallel with the flying capacitor in order to be able to connect a plurality of DC voltage sources having different low DC voltages.

In the case of this modified DC/DC converter 1 and the DC/DC converter 1 according to the disclosure, each of the switching elements 9 and 24 can be divided as necessary into a plurality of sub-switching elements. Additional flying capacitors may then be connected between said sub-switching elements.

The invention claimed is:

1. A DC/DC converter, comprising:
   a first low-voltage terminal point, a second low-voltage terminal point and a third low-voltage terminal point, and
   a first high-voltage terminal point and a second high-voltage terminal point,
   wherein the first low-voltage terminal point and the first high-voltage terminal point are directly connected to one another,
   wherein an actively drivable switching element, a capacitor and a further switching element are connected in series between the first high-voltage terminal point and the second high-voltage terminal point, and
   wherein the capacitor is connected between the second low-voltage terminal point and the third low-voltage terminal point,
   a further capacitance directly connected between the second low-voltage terminal point and the third low-voltage terminal point,
   wherein the further capacitance is decoupled from the capacitor at two terminals by two inductors, respectively.

2. The DC/DC converter as claimed in claim 1, wherein the two inductors are magnetically coupled in the manner of a current-compensated inductor.

3. The DC/DC converter as claimed in claim 1, further comprising a stabilizing capacitor connected between the first low-voltage terminal point and the second low-voltage terminal point or the third low-voltage terminal point.

4. The DC/DC converter as claimed in claim 1, further comprising, in parallel with the series connection of the actively drivable switching element, the capacitor and the further switching element, a link capacitor connected between the first high-voltage terminal point and the second high-voltage terminal point.

5. The DC/DC converter as claimed in claim 1, further comprising at least one half-bridge comprising an actively drivable bridge switching element and a further bridge switching element connected between the second low-voltage terminal point and the third low-voltage terminal point, wherein a center point of the half-bridge is connected to a further low-voltage terminal point via an input inductor.

6. The DC/DC converter as claimed in claim 1, wherein the further switching element comprises a further actively drivable switching element.

7. The DC/DC converter as claimed in claim 1, further comprising an additional low-voltage terminal point directly connected to the second high-voltage terminal point.

8. An inverter, comprising:
   a DC/AC converter, and
   a DC/DC converter, comprising:
      a first low-voltage terminal point, a second low-voltage terminal point and a third low-voltage terminal point, and
      a first high-voltage terminal point and a second high-voltage terminal point,
      wherein the first low-voltage terminal point and the first high-voltage terminal point are directly connected to one another,
      wherein an actively drivable switching element, a capacitor and a further switching element are connected in series between the first high-voltage terminal point and the second high-voltage terminal point, and wherein the capacitor is connected between the second low-voltage terminal point and the third low-voltage terminal point, a further capacitance directly connected between the second low-voltage terminal point and the third low-voltage terminal point, wherein the further capacitance is decoupled from the capacitor at two terminals by two inductors, respectively wherein the DC/AC converter is connected to the first and second high-voltage terminal points of the DC/DC converter and feeds into an AC voltage grid.

9. The inverter as claimed in claim 8, wherein in each case a DC voltage source is directly connected to the first low-voltage terminal point, on the one hand, and the second low-voltage terminal point, on the other hand.

10. The inverter as claimed in claim 8, wherein the DC/DC converter further comprises:
   at least one half-bridge comprising an actively drivable bridge switching element and a further bridge switching element connected between the second low-voltage terminal point and the third low-voltage terminal point, wherein a center point of the half-bridge is connected to a further low-voltage terminal point via an input inductor; and
   a DC voltage source connected to the first low-voltage terminal point, on the one hand, and the further low-voltage terminal point, on the other hand.

11. The inverter as claimed in claim 10, wherein the DC voltage source is a photovoltaic generator, wherein the further bridge switching element is a diode.

12. The inverter as claimed in claim 10, wherein the DC voltage source is a battery and/or some other store for electrical energy, and wherein the further bridge switching element is a further actively drivable bridge switching element.

13. The inverter as claimed in claim 8, wherein the DC/DC converter further comprises:
   at least two half-bridges comprising in each case an actively drivable bridge switching element and a further bridge switching element connected between the second input terminal point and the third input terminal point, respectively,
   wherein the center point of the respective half-bridge is connected respectively to a further input terminal point via an input inductor, and
   wherein in each case a DC voltage source is connected to the first low-voltage terminal point, on the one hand, and the further low-voltage terminal point on the other hand.

14. The inverter as claimed in claim 13, wherein at least two of the DC voltage sources are different photovoltaic generators.

15. The inverter as claimed in claim 13, wherein the DC voltage sources comprise a battery and/or some other store for electrical energy.

\* \* \* \* \*